United States Patent
Shinomoto et al.

(10) Patent No.: US 8,498,136 B2
(45) Date of Patent: Jul. 30, 2013

(54) AC-DC CONVERTER AND COMPRESSOR DRIVING APPARATUS AND AIR CONDITIONING APPARATUS USING THE SAME

(75) Inventors: Yosuke Shinomoto, Tokyo (JP); Kazunori Sakanobe, Tokyo (JP); Hideki Takahara, Tokyo (JP); Isao Kawasaki, Tokyo (JP); Satoshi Azuma, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 622 days.

(21) Appl. No.: 12/673,668

(22) PCT Filed: Aug. 29, 2007

(86) PCT No.: PCT/JP2007/066727
§ 371 (c)(1),
(2), (4) Date: Feb. 16, 2010

(87) PCT Pub. No.: WO2009/028053
PCT Pub. Date: Mar. 5, 2009

(65) Prior Publication Data
US 2011/0019452 A1  Jan. 27, 2011

(51) Int. Cl.
*H02M 7/00* (2006.01)
(52) U.S. Cl.
USPC .......................... 363/125; 363/127
(58) Field of Classification Search
USPC .............. 363/35, 36, 37, 108, 114, 125, 126, 363/127
See application file for complete search history.

(56) References Cited

U.S. PATENT DOCUMENTS 4,268,899 A * 5/1981 Rokas ............................. 363/61
5,619,400 A * 4/1997 Bowman et al. ................ 363/15

(Continued)

FOREIGN PATENT DOCUMENTS

JP  59-198873 A  11/1984
JP  2763479 B2   6/1998

(Continued)

OTHER PUBLICATIONS

Office Action (Notification of Reasons for Refusal) dated Mar. 7, 2012, issued in the corresponding Chinese Patent Application No. 200780100394.6, and an English Translation thereof. (4 pages).

(Continued)

*Primary Examiner* — Nguyen Tran
(74) *Attorney, Agent, or Firm* — Buchanan Ingersoll & Rooney PC

(57) ABSTRACT

An AC-DC converter is provided which suppresses a harmonic current and improves power factor at low cost. Such an AC-DC converter includes a rectifier connected to an AC power supply via a reactor, capacitors connected in series across the output terminals of the rectifier, a first bidirectional switch having one end connected to one input terminal of the rectifier and the other end connected to a connecting point of capacitors, a second bidirectional switch having one end connected to the other input terminal of the rectifier and the other end connected to the other end of the first bidirectional switch, and a control circuit for actuating the first and second bidirectional switches during a half cycle of the AC power supply so as to control a voltage inputted to the rectifier to a desired output voltage.

28 Claims, 10 Drawing Sheets

U.S. PATENT DOCUMENTS

| | | | | |
|---|---|---|---|---|
| 5,831,846 A | * | 11/1998 | Jiang | 363/125 |
| 5,956,243 A | * | 9/1999 | Mao | 363/61 |
| 6,009,007 A | * | 12/1999 | Pan | 363/98 |
| 7,274,579 B2 | * | 9/2007 | Ueda et al. | 363/125 |
| 7,394,675 B2 | * | 7/2008 | Hwang | 363/142 |

FOREIGN PATENT DOCUMENTS

| | | |
|---|---|---|
| JP | 2002-165459 A | 6/2002 |
| JP | 2003-9535 A | 1/2003 |
| JP | 3485047 B2 | 1/2004 |
| JP | 2004-129387 A | 4/2004 |
| JP | 3687641 B2 | 8/2005 |

OTHER PUBLICATIONS

International Search Report (PCT/ISA/210) dated Oct. 5, 2007 corresponding to PCT/JP2007/066727.

N. Hoshi et al., "A Switching Pattern Decision Scheme for Single-phase Multi-level Rectifiers", pp. I-2631-I-264 with Partial English Translation.

N. Hoshi et al. "Harmonic Control Scheme using Genetic Algorithm for Single-phase Multi-level Rectifiers", pp. 88-89 with Partial English Translation.

"Input Waveform Improvement of Single-phase Converter by Multi-level Voltage" p. 482 with Partial English Translation.

K. Oguchi et al. "Proposal of a Multilevel-Voltage Source Type Rectifier Having a Three-Phase Diode Bridge Circuit as a Main Power Circuit", pp. 497-498 with Partial English Translation.

Office Action from the Chinese Patent Office dated Sep. 18, 2012, issued in corresponding Chinese Patent Application No. 200780100394.6, with an English translation thereof.

Office Action from Chinese Patent Office dated Feb. 20, 2013, issued in corresponding Chinese Patent Application No. 200780100394.6, with English translation thereof.

* cited by examiner (a)

(b)

(c)

(d)

(e)

(f)

(g)

(h)

(a)

(b)

AC-DC CONVERTER AND COMPRESSOR DRIVING APPARATUS AND AIR CONDITIONING APPARATUS USING THE SAME

TECHNICAL FIELD

The present invention relates to an AC-DC converter for suppressing a harmonic current in an input current and converting an AC voltage into a DC voltage and a compressor driving apparatus and an air conditioning apparatus using such an AC-DC converter.

BACKGROUND ART

A conventional AC-DC converter provides short-circuiting of a power supply only once during a half cycle in synchronization with a zero-crossing of a power supply voltage, thereby suppressing a harmonic current flowing through a reactor for improving power factor (see, for example, Patent Document 1).

There is disclosed an apparatus in which the size of a reactor is reduced by short-circuiting a power supply more than once during a half cycle of a power supply since short-circuiting of a power supply only once during a half cycle results in an increase in the size of a reactor (see, for example, Patent Document 2).

In addition, there is disclosed an apparatus having a switch for switching between full-wave rectification and voltage doubler rectification and a switch for providing short-circuiting of a power supply, in which a harmonic current is suppressed by switching using these two switches, thereby improving power factor (see, for example, Patent Documents 3, 4).

Further, there is disclosed an apparatus in which an input current is controlled by actuating a switch using high-frequency PWM so as to have a substantially sinusoidal waveform, thereby suppressing a harmonic current and improving power factor (see, for example, Patent Document 5).

Furthermore, there is published a paper on an attempt to suppress a harmonic current by two switching operations (see, for example, non-Patent Document 1).

[Patent Document 1] Japanese Patent No. 2763479
[Patent Document 2] Japanese Patent No. 3485047
[Patent Document 3] Japanese Unexamined Patent Application Publication No. 2003-9535
[Patent Document 4] Japanese Patent No. 3687641
[Patent Document 5] Japanese Patent No. 2140103
[Non-Patent Document 1] "A Switching Pattern Decision Scheme for Single-phase Multi-level Rectifiers" No. 1-61 Industry Application Division Meeting of the Institute of Electrical Engineers of Japan 2005

DISCLOSURE OF INVENTION

Problems to be Solved by the Invention

Passing a short-circuit current by actuating a switch every half cycle of a power supply is a very simple control technique, and is widely in practical use as a technique which ensures suppression of harmonic current at low cost with less noise emissions, since actuating a switch during a half cycle of a power supply provides low-frequency switching at 100 Hz or 120 Hz.

However, a limit value is specified for a harmonic current component contained in an input current flowing from the power supply and the harmonic current must be restricted to below the limit value, but the restriction of the harmonic current to below the limit value leads to an increase in the size of a reactor.

Therefore, as illustrated in Patent Document 2 incorporated herein by reference, there is disclosed a technology for reducing the size of a reactor without any change in suppressing harmonic current by increasing the number of short-circuiting actuations of a switch. However, there is a problem of increased size of the reactor even if inductance remain unchanged, when power consumption and input current increase.

Consequently, as shown in Patent Document 5 incorporated herein by reference, which contains no description on high-frequency PWM, in particular, the frequency, generally actuating a switch at switching frequencies of 15 to 20 kHz or more results in a current having a substantially sinusoidal waveform and a drastic decrease in harmonic current. Also, it is theoretically possible to boost an outputted DC voltage to higher than a DC voltage when the switch is off, and the outputted DC voltage can be boosted until the reactor is magnetically saturated.

However, an approach disclosed in Patent Document 5 incorporated herein by reference is a current control that detects an input current and turns it into a substantially sinusoidal waveform, which requires high-speed control processing and a high-frequency PWM control. Such a high-frequency PWM control causes a great amount of noise emissions, leading to enormous costs for noise suppression. In addition, the current control that turns an input current into a substantially sinusoidal waveform requires high-speed control which poses a concern about high costs for complicated peripheral circuits needing analog control using high-performance microcomputers and dedicated ICs.

As shown in Patent Documents 3 and 4 incorporated herein by reference, the use of a switch for switching between full-wave rectification and voltage doubler rectification and a switch for providing short-circuiting of a power supply provides a broad variable range of DC voltage, but does not solve a problem of the large-sized reactor due to low-frequency switching.

In addition, suppression of a harmonic current in the input current by increasing the input voltage level of a rectifier using two switches is described in Non-Patent Document 1 incorporated herein by reference. Although this approach has an advantage of reducing the size of a reactor using low-frequency switching, it is required to calculate switch on/off timing using GA (Genetic Algorithm), assuming a change in operating conditions, such as controlling DC voltages and change in power consumption. Accordingly, GA has a problem with installation onto the control CPU such as microcomputers because parameters are determined only after complicated operation and change of generation are repeated. Further, since parameters operated must be stored in memory or the like in advance, GA takes an extended period of time for development to apply to a product having many models, and requires a great amount of memory, so that there is a problem with practical application.

The present invention is achieved to solve the above-mentioned problems. The first object of the present invention is to provide an AC-DC converter which suppresses a harmonic current and improves power factor using switching PWM at low frequencies of 5 kHz or less at lower cost than a high frequency PWM.

In addition, the second object of the present invention is to provide an AC-DC converter that suppresses a harmonic current by short-circuiting of a power supply once or more than once during a half cycle of a power supply for reduction in the size of a reactor and reduction in cost at similar levels.

Furthermore, the third object of the present invention is to provide an AC-DC converter for practical use that controls a DC voltage such that it can be applied to a plurality of models having different operating conditions and that provides a feedback configuration such that switch on/off timing is variable according to power consumption.

Means for Solving the Problems

An AC-DC converter according to the present invention comprises a rectifier connected to an AC power supply via a reactor, a plurality of capacitors connected in series across output terminals of the rectifier, a first bidirectional switch having one end connected to one input terminal of the rectifier and another end connected to a connecting point between a plurality of capacitors, a second bidirectional switch having one end connected to another input terminal of the rectifier and another end connected to the another end of the first bidirectional switch, and control means for actuating the first and second bidirectional switches during a half cycle of the AC power supply so as to control a voltage inputted to the rectifier to obtain a desired value of an output voltage.

Advantages

According to the present invention, the first and second bidirectional switches are actuated during a half cycle of an AC power supply such that a voltage inputted to the rectifier is controlled to a desired output voltage, thereby allowing a current flowing thorough a reactor to have a sinusoidal waveform. This results in a more reduction in a size of the reactor than a conventional system in which a switch is actuated only once or several times during a half cycle of a power supply.

In addition, the size of the reactor cannot be reduced compared with switch actuation based on a high-frequency PWM, however, operation based on PWM at low frequencies of 1 kHz to 5 kHz is possible, which results in no increase in cost for noise suppression caused by the high frequency PWM, thereby ensuring low-cost implementation.

Furthermore, the present invention can be easily applied to product groups having various models and different specifications without searching for parameters necessary for obtaining a desired output voltage by performing feedback control of the desired output voltage.

REFERENCE NUMERALS

Figure 1:
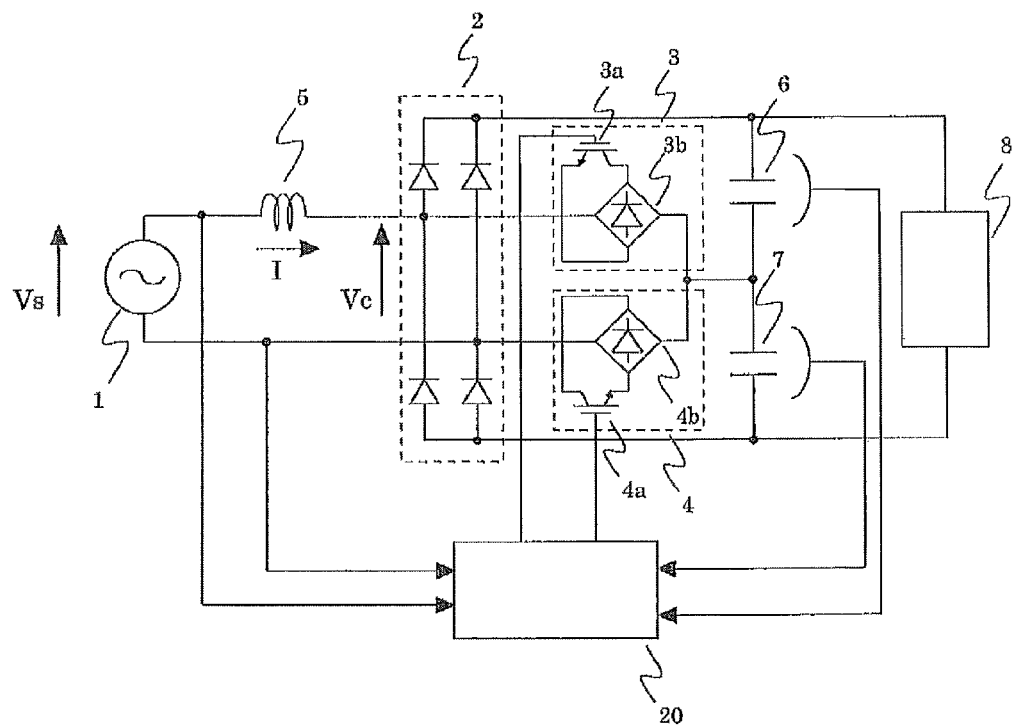
FIG. 1 is a circuit block diagram showing an AC-DC converter according to Embodiment 1 of the present invention.

1 AC power supply
2 rectifier
3 first bidirectional switch
4 second bidirectional switch
5 reactor
5a winding
6 first capacitor
7 second capacitor
8 DC load
9 virtual AC power supply
10 first bidirectional switch
11 second bidirectional switch
20 control circuit
21 power supply phase detecting section
22 overcurrent detecting section
23 first voltage detector
24 second voltage detector
25 overvoltage detecting section
26 converter voltage calculating section
27 actuation signal generating section
30 compressor
30a motor
31 condenser
32 expansion valve
33 evaporator
40 ΔΣ converter
41 integrator
42 quantizer
43 delay circuit
51 winding
52 center core
53 upper core
54 resin component
60 first switching element
61 first diode
62 second switching element
63 second diode

BEST MODES FOR CARRYING OUT THE INVENTION

Embodiment 1

FIG. 1 is a circuit block diagram showing an AC-DC converter according to Embodiment 1 of the present invention.

The AC-DC converter as shown in FIG. 1 includes a rectifier 2 for rectifying an AC input from an AC power supply 1, a first bidirectional switch 3 having one end connected to one input terminal of the rectifier 2, a second bidirectional switch 4 having one end connected to the other input terminal of the rectifier 2, a reactor 5 inserted between the AC power supply 1 and one input terminal of the rectifier 2, first and second capacitors 6, 7 connected in series across the output terminals of the reactor 2, a control circuit 20 that controls to provide a desired output voltage for application to a DC load 8 by operating both of the first and second bidirectional switches 6, 7 during a half cycle of the AC power supply 1. The first bidirectional switch is composed of, for example, an IGBT 3a and a diode rectifier 3b. Likewise, the second bidirectional switch is composed of an IGBT 4a and a diode rectifier 4b.

Although the circuit configuration in FIG. 1 is the same as those in Patent Documents 3 and 4 incorporated herein by reference, except for the provision of the first and second bidirectional switches 3, 4, the operation of the first and second bidirectional switches 3, 4 largely affects the effects and advantages, as described below.

Operation of a converter disclosed in, for example, Patent Document 3 incorporated herein by reference is described below with reference to FIG. 2, which is a conventional waveform chart for describing Embodiment 1.

In conventional technology, a switch SW1 provides a one-pulse short-circuiting operation during a half cycle of the power supply, while a switch SW2 provides switching between full-wave rectification and voltage doubler rectification. One-pulse short-circuiting operation by the switch SW1 during a half cycle of the power supply results in an input current waveform as shown in FIG. 2(b). This is because the converter is on for the duration of Ton in response to a one-pulse short-circuiting signal (as shown in FIG. 2(c)) at a predetermined delay time of Td1 after zero crossover points (black dots in FIG. 2(a)) of power supply voltage, which causes an electric current to flow through the switch SW1, resulting in a current superposed by partly sharp-pointed waveforms (see FIG. 2(b)).

The switch SW2 is designed to provide switching between full-wave rectification and voltage doubler rectification, and therefore can include a mechanical switch such as a relay. This is intended to widen a voltage control range by providing two reference voltage levels, a voltage based on full-wave rectification and a voltage based on voltage doubler rectification for the base of the DC voltage to be applied to the DC load 8.

In Embodiment 1, the first and second bidirectional switches 3, 4 are repeatedly switched on and off. Accordingly, a mechanical switch encounters a problem of short contact life or welding associated with on and off operation, requiring a semiconductor switch configuration. Also, in Embodiment 1, the first and second bidirectional switches 3, 4 serve the same purpose, while in conventional technology, two switches serve the different purposes. Furthermore, the AC-DC converter according to Embodiment 1 can be achieved by actuating both of the two bidirectional switches 3, 4 as represented by a virtual AC power supply in FIG. 3.

Figure 3:
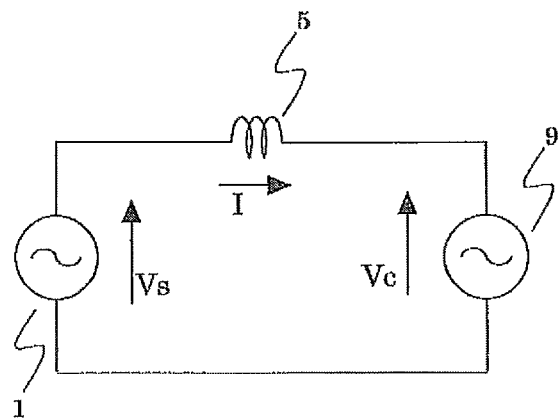
FIG. 3 is a circuit configuration diagram under an ideal condition for describing Embodiment 1.

FIG. 3 is a circuit configuration diagram showing an ideal condition for describing Embodiment 1. The AC power supply 1 and the reactor 5 are the same as those in FIG. 1, and the AC-DC converter is represented as the virtual AC power supply 9. Also, like FIG. 1, a voltage across the terminals of the AC power supply 1, a voltage across the terminals of the virtual AC power supply 9, and a current flowing through the reactor 5 are denoted Vs, Vc, and I, respectively.

The current I flowing through the reactor 5 is determined by the voltage difference between the AC power supply 1 and the virtual AC power supply 9. If the voltage across the terminals of the reactor 5 is given as jwLI, jwLI=Vs−Vc, where w is an angular frequency, L is an inductance of the reactor 5, and j is an imaginary number.

If the voltage Vs of the AC power supply 1 is Vs=V1·sin(wt), the voltage Vc of the virtual AC power supply 9 is Vc=V2·sin(wt−φ), and φ is the phase difference between Vs and Vc, and assuming that V1=V2, the current I flowing through the reactor 5 is given by the following formula.

$$I = 1/jwL \cdot 2 \cdot \sin(\phi/2) \cdot \cos(wt - \phi/2)$$

If the phase difference between Vs and Vc does not change, sin(φ/2) is a constant. Accordingly, the current I is given by the following formula, K representing all the constants.

$$I = -j \cdot K \cdot \cos(wt - \phi/2)$$

As described above, when the voltage Vc output from the virtual AC power supply 9 has a sinusoidal waveform, the current I flowing through the reactor 5, namely, an input current I is a sinusoidal current, suppressing a harmonic current. Also, the phase difference between the current I and the AC power supply 1 becoming zero causes the power factor of the power supply to become 100 percent. Accordingly, if the phase difference φ between the amplitude $V_2$ of the virtual AC power supply 9 and that of the AC power supply 1 is properly controlled so as to output a sinusoidal voltage, a harmonic component in an input current can be suppressed, thereby enhancing the power factor.

Figure 4:
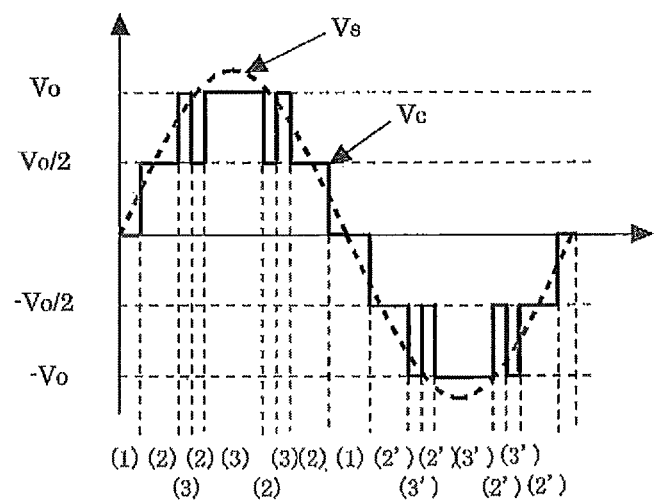
FIG. 4 is a voltage waveform chart for describing an operating principle in Embodiment 1.

Consequently, as described in non Patent Document 1, actuating the first and second bidirectional switches 3, 4 causes the voltage Vc across the input terminals of the rectifier 2 as shown in FIG. 1 to be a three-level voltage having a substantially sinusoidal waveform as shown in FIG. 4. Vo shown in FIG. 4 is a DC voltage applied to the DC load 8. FIG. 4 is a voltage waveform chart for describing an operating principle in Embodiment 1.

Figure 5:
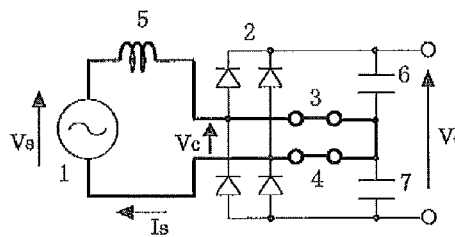
FIG. 5 is circuit diagrams each corresponding to operation of first and second bidirectional switches in the AC-DC converter according to Embodiment 1.
Figure 5:
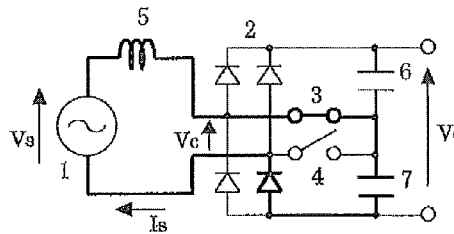
Figure 5:
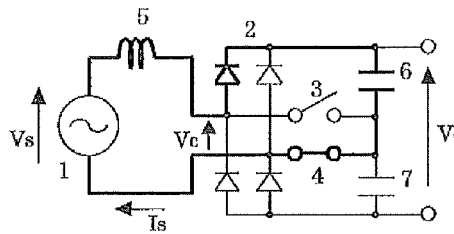
Figure 5:
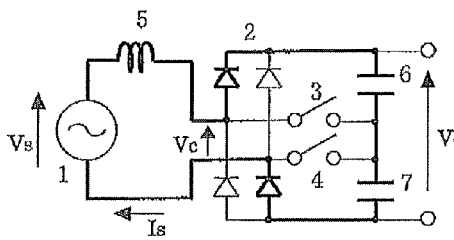
Figure 5:
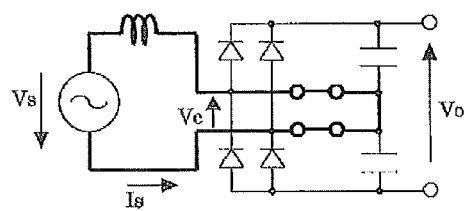
Figure 5:
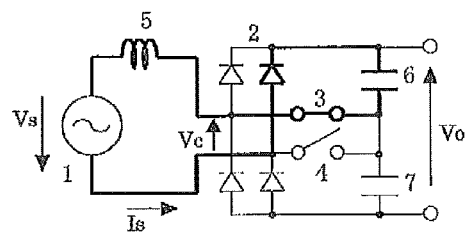
Figure 5:
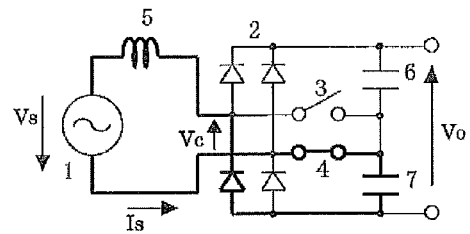
Figure 5:
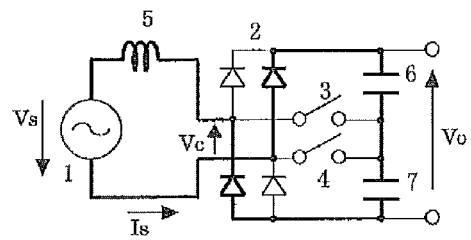

The voltage waveform in FIG. 4 is described on the basis of circuit diagrams shown in FIG. 5. FIG. 5 shows circuit diagrams each corresponding to operation of first and second bidirectional switches in an AC-DC converter according to Embodiment 1.

The first and second bidirectional switches 3,4, two in total, result in four different on-and-off combinations. When the two bidirectional switches 3, 4 are simultaneously turned on (power supply short-circuit mode), input terminals across the rectifier 2 are short-circuited. FIG. 5(a) shows circuit operation thereat. Since the first and second bidirectional switches 3,4 being simultaneously in the on state causes the input terminals across the rectifier 2 to be short-circuited as described above, the voltage Vc becomes 0 (Vc=0), and the voltage in region (1) of a voltage waveform in FIG. 4 is outputted as a converter voltage Vc.

When the first bidirectional switch 3 is in the on state and the second bidirectional switch 4 is in the off state (first voltage doubler rectification mode), the voltage Vc across the input terminals of the rectifier 2 is equal to the voltage across the second capacitor 7, as shown in FIG. 5(b). Therefore, the voltage Vc becomes a half of the DC voltage Vo and is outputted as a converter voltage Vc. In this case, the voltage is a voltage in region (2) of the voltage waveform.

On the contrary, when the first bidirectional switch 3 is in the off state and the second bidirectional switch 4 is in the on state (second voltage doubler rectification mode), the voltage across the input terminals of the rectifier 2 becomes equal to the voltage across the first capacitor 6, as shown in FIG. 5(c), and, therefore, becomes a half of the DC voltage Vo as in the case in FIG. 5(b). In this case, a voltage in region (2) is also outputted as a converter voltage Vc.

When the first bidirectional switch 3 is in the off state and the second bidirectional switch 4 is in the off state (full-wave rectification mode), the voltage Vc across the input terminals of the rectifier 2 becomes equal to the voltage Vo across the first and second capacitors 6, 7, as shown in FIG. 5(d). At this time, the voltage is a voltage in region (3) of the voltage waveform.

The converter voltage Vc can be outputted as a three-level sinusoidal voltage by properly controlling a temporal ratio at which, and an order in which, regions (1) to (3) of the voltage waveform as shown in FIG. 4 are generated.

FIGS. 5(e) to 5(h) are the same as FIGS. 5(a) to 5(d), except that the AC power supply has a different polarity. The fact that Vc does not change in direction only is intended to show that, when Vc, namely, Vs has a negative polarity, Vc also has a negative polarity. Accordingly, even a region having a negative polarity can generate a region (2') having reverse polarity of Vc=−Vo/2 and a region (3') having Vc=−Vo as well.

As described above, a proper combination of on and off actuations of the first and second bidirectional switches 3, 4 enables the voltage Vc across the input terminals of the rectifier 2 to be outputted as a voltage having more levels, namely, three levels of 0, Vo/2, and Vo, than that achieved by short-circuit switching once or twice during a half cycle of a power supply, thereby allowing a reduction in the size of the reactor 5 while low-frequency switching remains unchanged.

Furthermore, in FIGS. 5(b), 5(c), 5(f), and 5(g), connection point between the first and second capacitors 6, 7 is connected to one end of the AC power supply, which constitutes a circuit having the same configuration as that used for so-called voltage doubler rectification. The DC voltage Vo can be controlled so as to be greater than a DC voltage obtained by full-wave rectification by properly controlling the occurrence ratio at which either one of the two bidirectional switches 3, 4 is in the on state, in other words, the ratio at which Vo/2 is outputted as the converter voltage Vc.

Non Patent Document 1 describes a technology for controlling actuation of the two bidirectional switches 3, 4 by determining it in advance with an analytical tool, such as a personal computer. However, on/off timing can be set in an infinitely variable manner depending on a phase angle. In addition, it is virtually impossible to search for an on/off timing that causes the DC voltage Vo to become equal to a desired voltage value.

Accordingly, non Patent Document 1 proposes a search method based on GA. However, no search method has been identified which seeks an on/off timing that causes the DC voltage Vo to be equal to a desired voltage value besides suppressing the harmonic current. In addition, it is difficult to put a method for extracting required parameters into practical use from innumerable parameters in the case of products having variable load conditions for operation and those having many models.

In Embodiment 1, an on/off timing is not sought in advance by calculation. Instead, the on/off timing of the two bidirectional switches 3, 4 is determined by feedback control.

Figure 6:
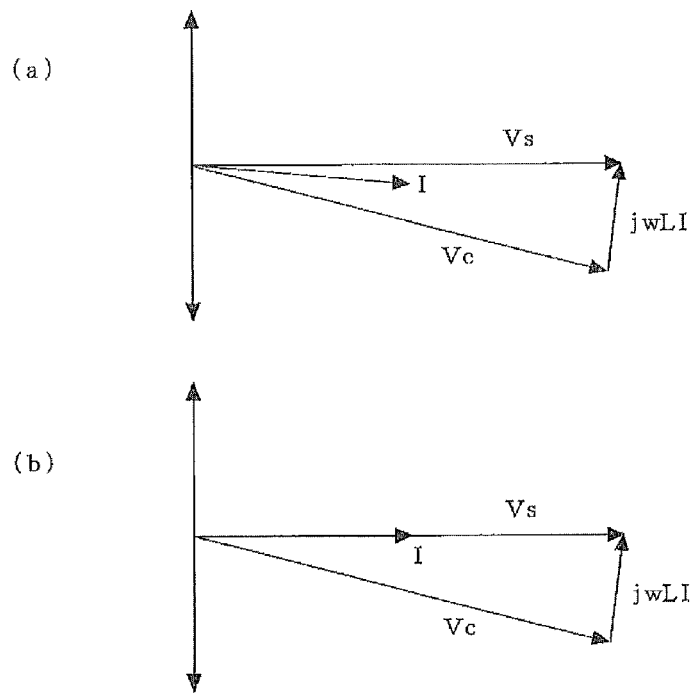
FIG. 6 is a vector diagram derived from a principle circuit configuration in FIG. 3.

Feedback control in Embodiment 1 is described below using FIG. 6. FIG. 6 is a vector diagram derived from a principle circuit configuration in FIG. 3, which can be commonly found in school textbooks. FIG. 6(a) is a vector diagram showing that the current I exhibits a lagging phase in the reactor 5 in relation to the voltage Vs of the AC power supply 1. A voltage drop jwLI occurs in the reactor 5 so as to be perpendicular to the current I, resulting in the coincidence with the voltage Vs of the AC power supply 1 by vector addition of Vc, the converter voltage across the input terminals of the rectifier 2.

In order to output the converter voltage Vc whose power factor of 1, a triangle of FIG. 6(a) should be a right triangle having Vs perpendicular to jwLI as shown in FIG. 6(b). Accordingly, the converter voltage Vc should control a phase angle such that its lagging phase $\phi$ is a value given by the following formula in relation to the AC power supply 1.

$$\phi = \tan^{-1}(wLI/Vs)$$

Also, the amplitude $V_2$ of the converter voltage Vc is outputted so as to be $V_2 = V_1/\cos(\phi)$. Alternatively, it may be outputted so as to be $\sqrt{(Vs^2 + (wLI)^2)}$ from Pythagorean theorem for a right triangle in FIG. 6(b).

Configuring a control system such that the phase angle and amplitude of a voltage to be outputted are uniquely determined enables an actuation signal for actuating the two bidirectional switches 3, 4 to be created through application of a well-known modulation method, such as sawtooth modulation, triangular wave modulation, space vector modulation, or dipolar modulation.

Since the amplitude $V_2$ of the converter voltage Vc is a function of the phase angle $\phi$, a phase difference $\phi$ between the voltage Vs of the AC power supply 1 and the converter voltage Vc may be derived by feedback. This time, the phase angle $\phi$ is determined by DC voltage control in order to control the DC voltage Vo of the output from the AC-DC converter.

Figure 7:
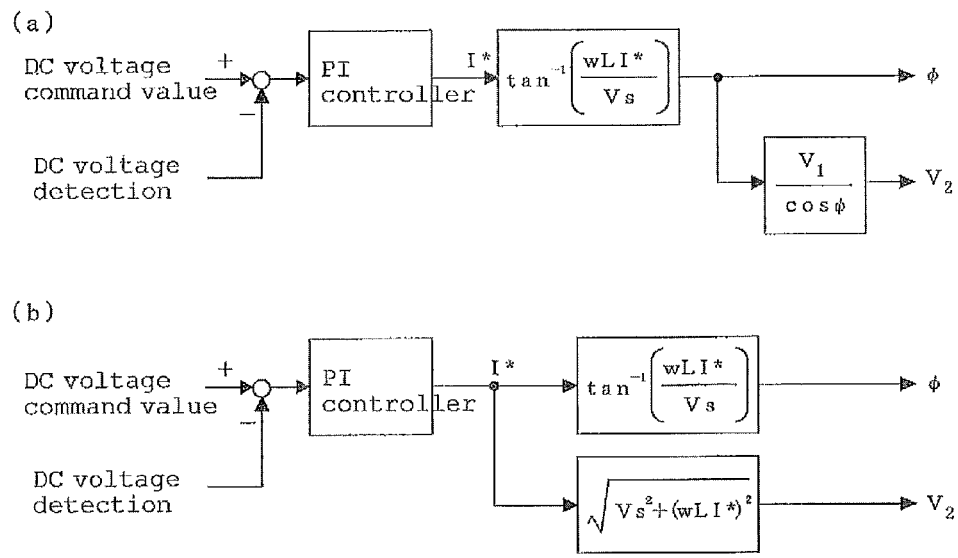
FIG. 7 is a block diagram showing feedback control in the AC-DC converter according to Embodiment 1.

FIG. 7 shows an example of a control block for controlling a phase angle $\phi$. A DC voltage command value is compared with a DC voltage detected value (Vo) and its difference is inputted to a PI controller. It is apparent from Patent Document 5 herein incorporated by reference that the output from the PI controller is generally a current command. Accordingly, if a current flows so as to become an output from the PI controller, control of the phase angle $\phi$ can be performed.

Since the phase angle $\phi$ is a function of the voltage Vs of the AC power supply 1 and the input current I and the voltage Vs of the AC power supply 1 is known, the phase angle $\phi$ can be derived by substituting the output from the PI controller for the current I in the afore-mentioned formula for the phase angle $\phi$. Once the phase angle $\phi$ is derived, the amplitude $V_2$ can easily be calculated. In addition, PLL operation poses no problem in synchronizing the phase angle $\phi$ with the phase of the AC power supply 1, which results in improvement in accuracy of the phase angle$\phi$ as well as a further decrease in harmonic current. Needless to say, as shown in FIG. 7(b), instead of generating the amplitude $V_2$ from the phase angle $\phi$, deriving the amplitude V2 from a current command, an output from the PI controller as shown in FIG. 7(b), on the basis of a right triangle as shown in FIG. 6(b) poses no problem, providing similar effects.

Figure 8:
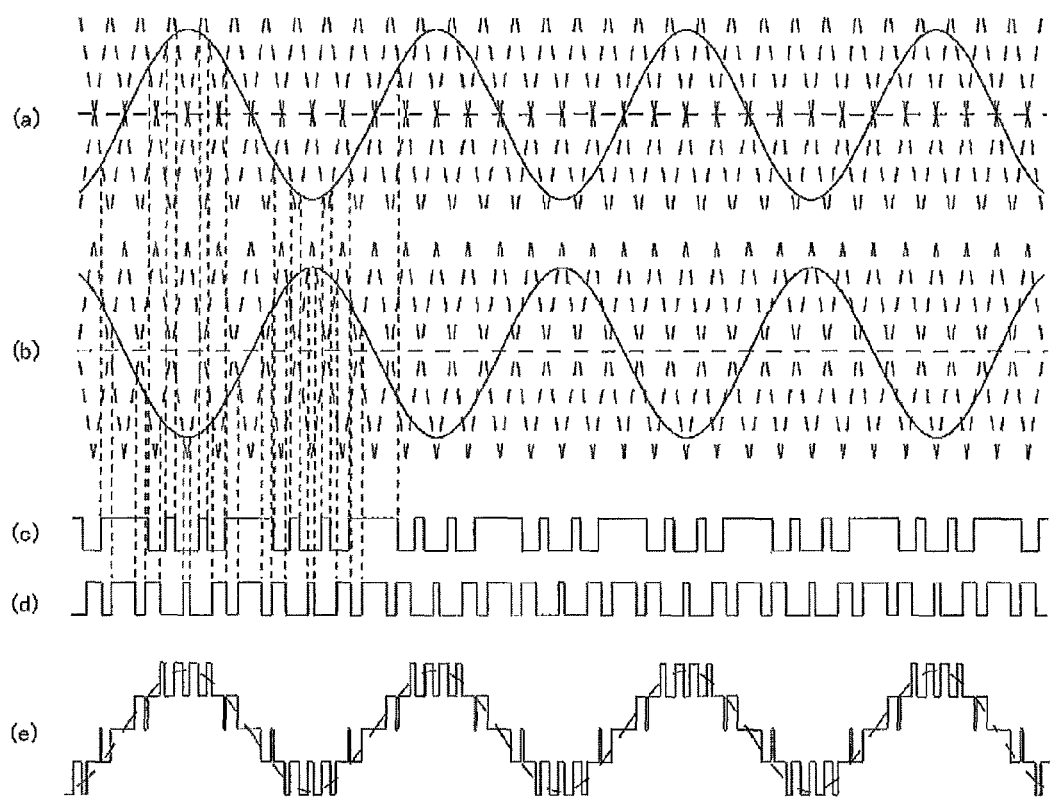
FIG. 8 is a modulation waveform chart of actuation signals in an AC-DC converter according to Embodiment 1.

The converter voltage Vc can be generated by these procedures. Distribution of this voltage Vc to the first and second bidirectional switches 3, 4 can be accomplished by an ordinary unipolar modulation. FIG. 8 shows a waveform chart of such a unipolar modulation. The sinusoidal waveforms shown in FIGS. 8(a) and 8(b) are the output voltage Vc. FIG.

8(*a*) shows a modulation signal for the first bidirectional switch 3, while FIG. 8(*b*) shows a modulation signal for the second bidirectional switch 4.

First, the waveform in FIG. 8(*a*) is described below. Comparison is made using a triangular wave in which the polarity is inverted between the positive and the negative. The calculated absolute value of the negative side is the same as the positive side, which indicates the unipolar modulation. Turning off when the converter voltage Vc is greater than a triangular wave, a carrier wave, provides an actuation signal for the first bidirectional switch 3 (see the waveform (Hi side: on) in FIG. 8(*c*)).

Next, in the case of the waveform in FIG. 8(*b*), the second bidirectional switch 4 has a negative polarity in relation to the converter voltage Vc, causing a modulation waveform to become a sinusoidal wave voltage −Vc having a phase inverted by 180 degrees in relation to that in FIG. 8(*a*). Also, the triangular wave of a carrier wave has a phase inverted by 180 degrees in relation to that in FIG. 8(*a*). Comparing this modulation wave with the carrier wave as described above provides an actuation signal for the second bidirectional switch 4 (see the waveform in FIG. 8(*d*)).

The converter voltage Vc generated by actuating the first bidirectional switch 3 and the second bidirectional switch 4 in the waveforms in FIGS. 8(*c*) and 8(*d*) can also be obtained by the addition of the waveforms in FIGS. 8(*c*) and 8(*d*). However, since in the waveforms in FIGS. 8(*c*) and 8(*d*), Hi is switching on, the addition of Hi, being 0, and Lo, being 1, provides a chopped converter voltage Vc as shown in FIG. 8(*e*). Accordingly, the converter voltage Vc can be distributed to the first and second bidirectional switches 3, 4 through application of the unipolar modulation.

Converters in FIGS. 5(*c*) and 5(*d*) include the AC power supplies 1 having the same polarity and the same circuit, a so-called voltage doubler rectification configuration, which requires a circuit configuration that outputs a different Vo/2 value during the same polarity. Although two capacitors 6, 7 connected in series are provided for outputting one-half of the DC voltage Vo, the voltage doubler rectification is in effect while Vo/2 is being outputted, causing either one of the first capacitor 6 or the second capacitor 7 to be charged. Only one of the capacitors being charged fails to provide one-half of the output voltage across the capacitors, which distorts the converter voltage Vc as well as the input current, resulting in failure to suppress a harmonic current.

Accordingly, it is necessary to actuate the first bidirectional switch 3 and the second bidirectional switch 4 in a balanced manner such that the first capacitor 6 and the second capacitor 7 are charged to maintain one-half of the DC voltage Vo in a balanced manner while the AC power supplies 1 have the same polarity.

The unipolar modulation is well-suited to this circuit configuration in that two operation modes which give Vc=Vo/2, one mode in which only the first bidirectional switch 3 is in the on state and the other mode in which only the second bidirectional switch 4 is in the on state, are alternated.

Embodiment 1 is described above in terms of unipolar modulation. Needless to say, any other modulation system, such as bipolar modulation, dipolar modulation, sawtooth modulation, and space vector modulation, provide similar effects if the two bidirectional switches 3, 4 can be actuated in a balanced manner so as to output the voltage Vc.

As described above, according to Embodiment 1, the first bidirectional switch 3 and the second bidirectional switch 4 are actuated in a balanced manner to cause the converter voltage Vc across the input terminals of the rectifier 2 to be a three-level sinusoidal wave voltage, thereby allowing the current I flowing through the reactor 5 to have a sinusoidal waveform. This allows further reduction in the size of the reactor 5 compared with a conventional system in which switches are actuated once or several times during a half cycle of the power supply.

Although further reduction in the size of the reactor 5 cannot be accomplished through switch actuation using a high-frequency PWM, actuation using a low frequency, for example, 1 kHz to 5 kHz PWM is possible, leading to no increase in costs for measures taken against noise caused by the high-frequency PWM as well as the implementation at low cost. This is because the implementation of sinusoidal wave converter voltage Vc output allows an input current to have a substantially sinusoidal waveform without input current control, thereby enabling actuation using a low-frequency PWM.

Furthermore, the converter voltage Vc can easily be applied to product groups having various models and different specifications by performing feedback control of the DC voltage Vo using, for example, the unipolar modulation without searching for a parameter necessary for a desired output voltage.

Embodiment 2

Figure 9:
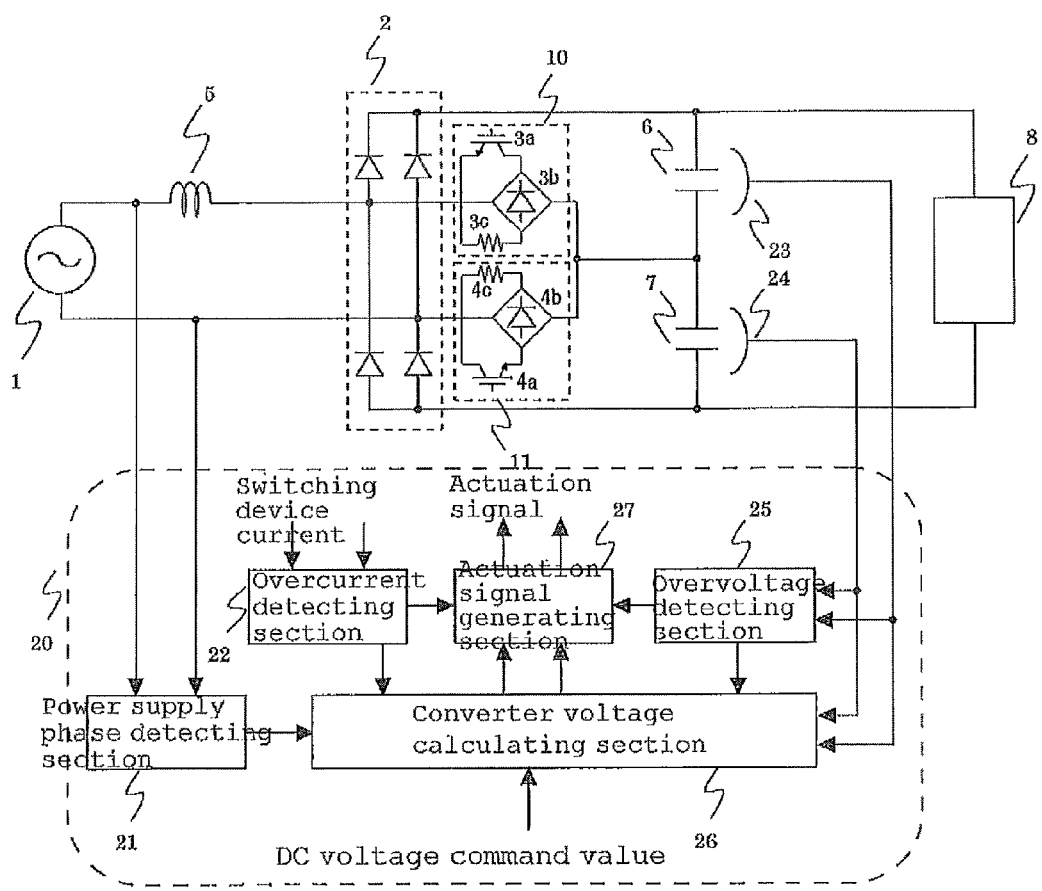
FIG. 9 a circuit block diagram showing the AC-DC converter according to Embodiment 2 of the present invention.

FIG. 9 a circuit block diagram showing an AC-DC converter according to Embodiment 2 of the present invention. The reference numerals and symbols in FIG. 9 refer to the same components as those with the same reference numerals and symbols in Embodiment 1 described in FIG. 1, and repeated descriptions of the same components are omitted.

In FIG. 9, a first bidirectional switch 10 is provided with a current detector 3*c* for detecting a current flowing through an IGBT 3*a*, while a second bidirectional switch 11 is provided with a current detector 4*c* for detecting a current flowing through an IGBT 4*a*.

A control circuit 20 includes a power supply phase detecting section 21 for detecting the phase of an AC power supply 1, an overcurrent detecting section 22 for detecting an overcurrent based on a detected current from a first bidirectional switch 10 and a second bidirectional switch 11, a first voltage detector 23 for detecting a voltage across a first capacitor 6, a second voltage detector 24 for detecting a voltage across a second capacitor 7, an overvoltage detecting section 25 for detecting an overvoltage based on a voltage from the first voltage detector 23 and the second voltage detector 24, a converter voltage calculating section 26 for calculating converter voltages Vc resulting from actuation of the first and second bidirectional switches 10, 11, respectively, which performs feedback control to a DC voltage command value based on voltages detected by the first and second voltage detectors 23, 24 and the power supply phase of the power supply phase detecting section 21, and an actuation signal generating section 27 for generating an actuation signal for the two bidirectional switches 10, 11 from the signals from the overcurrent detecting section 22 and the overvoltage detecting section 25 and a converter voltage Vc calculated by the converter voltage calculating section 26.

The first capacitor 6 and the second capacitor 7 must have voltages thereacross balanced against each other. This is because a voltage across each of the capacitors is alternately outputted as the converter voltage Vc. If such a voltage level is not Vo/2, the converter voltage Vc serves as a voltage source having an asymmetric harmonic distortion, causing a higher harmonic current to be present in the current I flowing through the reactor 5. Also, this causes the harmonic current to increase as well as causes a DC offset component to be superposed on the input current, which poses a concern about the negative effect on other apparatuses connected to the AC power supply 1. Furthermore, there is concern that a voltage applied across the capacitors exceeds the withstand voltage of one of the capacitors and that degradation of one of the capacitors progresses.

An attempt is made to detect a voltage across each of the capacitors with the first voltage detector 23 for detecting a voltage across the first capacitor 6 and the second voltage detector 24 for detecting a voltage across the second capacitor 7. In FIG. 5(*b*), for example, the first bidirectional switch 3 being in the on state causes the second capacitor 7 to be charged, while in FIG. 5(*c*) the second bidirectional switch 4 being in the on state causes the first capacitor 6 to be charged. On the contrary, if the AC power supply 1 has its polarity inverted, the first bidirectional switch 3 being in the on state causes the first capacitor 6 to be charged as shown in FIG. 5(*f*), while in FIG. 5(*g*) the second bidirectional switch 4 being in the on state causes the second capacitor 7 to be charged.

As described above, a switch and a capacitor to be charged are alternated according to the polarity of the AC power supply 1, which results in voltage imbalance across the capacitors. Such a voltage imbalance is described below.

When both of the first bidirectional switch 10 and the second bidirectional switch 11 are in the on state, the converter voltage Vc is 0, as described above. However, the two bidirectional switches 10, 11 is composed of an IGBT and a diode rectifier in FIG. 1 or FIG. 9, where these semiconductors generate a small amount of saturated voltage even at the time of on state, and the voltage is not 0. Accordingly, when the AC power supply 1 has a positive polarity, the converter voltage Vc is greater than 0 (Vc>0), while when it has a negative polarity, the converter voltage Vc is smaller than 0 (Vc<0).

The converter voltage Vc has a lagging phase behind the voltage Vs of the Ac power supply 1. Accordingly, a state where Vs and Vc have opposite polarity to each other occurs immediately after the zero cross of the AC power supply 1. In such a state where there are different polarities immediately after the zero cross, the relationship between a capacitor to be charged by switching and the saturation voltage is reversed. For this reason, if the capacitor to be charged is alternated according to the polarity of the AC power supply 1, only a small amount of the saturation voltage within such a small section having different polarities is dealt as an error voltage and charged across one of the capacitors without being offset.

This means, for example, that a negative saturation voltage is charged across the first capacitor 6 and a positive saturation voltage is charged across the second capacitor 7. Remember that a saturation voltage having an opposite polarity is charged across each of the capacitors 6, 7.

Figure 10:
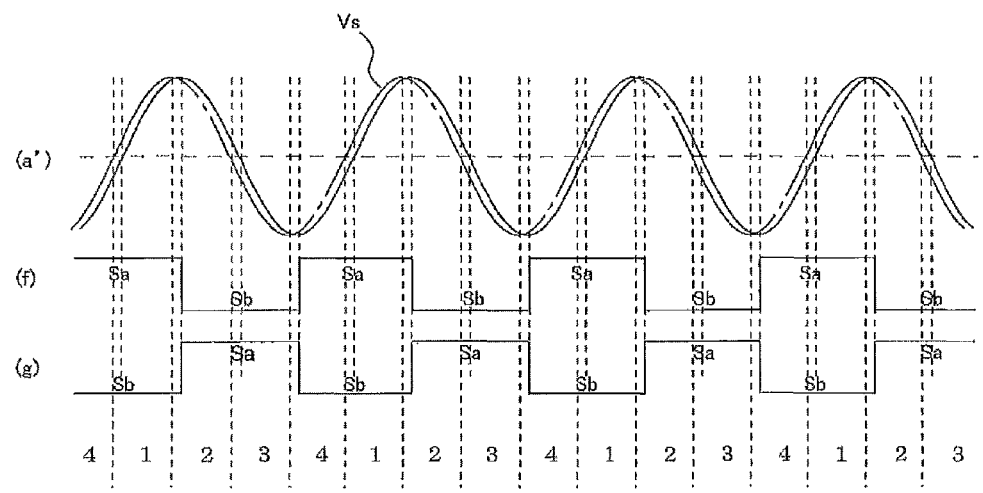
FIG. 10 is a waveform chart showing allocation of actuation signals for first and second bidirectional switches in the AC-DC converter according to Embodiment 2.

Consequently, in this embodiment 2, the first and second bidirectional switches 10, 11 are actuated so as to ensure that such an error voltage, a cause of imbalance in the vicinity of the zero cross, is charged across one of the capacitors. It is described below using FIG. 10. FIG. 10 is a waveform chart showing allocation of actuation signals for first and second bidirectional switches in an AC-DC converter according to Embodiment 2. The chart in FIG. 10 corresponds to modulation signals in FIG. 8, so the sinusoidal wave of modulation signals in FIG. 8(*a*) corresponds to the sinusoidal wave shown in solid line in FIG. 10(*a'*). The sinusoidal wave shown in dashed-dotted line in FIG. 10(*a'*) represents the voltage Vs of the AC power supply 1. The voltage Vs of the AC power supply 1 is divided into quarterly sections, first to fourth sections, which are shown in FIG. 10. A section between a rising zero cross point and a positive peak point of the AC power supply 1 is denoted Section 1, while a section between the positive peak point and a falling zero cross point is denoted Section 2.

In FIG. 8, the actuatin signals (*c*), (*d*) for actuating the two bidirectional switches 10, 11 have different duty widths, and therefore an amount of charge across the capacitors varies with the actuation signal of (*c*) and (*d*). Assuming that the signal in FIG. 8(*c*) is an actuation signal for Sa, the first bidirectional switch 10, and the signal in FIG. 8(*d*) is an actuation signal for Sb, the second bidirectional switch 11, charging by the signal in FIG. 8(*c*) is performed on the second capacitor 7 in section 1 as shown in FIG. 10 and on the first capacitor 6 in section 3. If there is no error in saturation voltage resulting from afore-mentioned lagging phase, reversal of polarity in the AC power supply 1 alternates charging capacitors, which offsets an amount of charge, resulting in no imbalance.

However, due to the error in the saturation voltage, the signal in FIG. 8(*c*) is equally allocated into Sa, the first bidirectional switch 10, and Sb, the second bidirectional switch 11. Allocation of the actuation signals in FIGS. 8(*c*), 8(*d*) is altered between sections 1 and 3 and sections 2 and 4 to ensure coincidence of a capacitor to be charged in sections 1 and 3 in the voltage doubler rectification.

The signal shown in FIG. 10(*f*) represents allocation of the actuation signals in FIG. 8(*c*). The signals in FIG. 8(*c*) are allocated to Sa, the first bidirectional switch 10, in sections 1 and 4 and to Sb, the second bidirectional switch 11 in sections 2 and 3. Likewise, the signal shown in FIG. 10(*g*) represents allocation of the actuation signals in FIG. 8(*d*). As shown in FIGS. 10(*f*) and 10(*g*), allocation of the actuation signals is altered every one-fourth cycle of the AC power supply 1 such that a phase angle at a half wave of the power supply and the allocation of the charging capacitor coincide.

Voltage imbalance can be suppressed by re-allocating actuation signals obtained by the unipolar modulation with a capacitor to be charged in mind. Although re-allocated signals are generated using combinations of sections 1 and 4 and sections 2 and 3 in preceding descriptions, re-allocation with a capacitor to be charged in mind will suffice.

For example, since capacitors to be charged alternate depending on the polarity of the AC power supply 1, re-allocation in accordance with the polarity of the AC power supply 1 provides similar effects. Re-allocation in accordance with the polarity of the AC power supply 1 results in combinations of sections 1 and 2 and sections 3 and 4.

In addition, the first voltage detector 23 is used to determine the modulation factor for the switch for charging the first capacitor 23, while the second voltage detector 24 is used to determine the modulation factor for the switch for charging the second capacitor.

As described above, according to Embodiment 2, allocation of the actuation signals for the two bidirectional switches 10, 11 are altered in such a manner that charging modes always coincide at the phase angle of the power supply, and, in addition to it, the modulation factor of the actuation signals for turning on or off the two bidirectional switches 10, 11 are determined respectively based on a detected voltage, thereby minimizing the voltage imbalance between the first capacitor 6 and the second capacitor 7 to the utmost.

Needless to say, a voltage difference between the voltage detected by the first voltage detector 23 and that detected by the second voltage detector 24 is calculated and the modulation factor is manipulated so as to adjust an amount of charge of both of the capacitors by such a voltage difference, resulting in the same effects as the preceding method. In addition, needless to say, a voltage difference between the voltage detected by the first voltage detector 22 and that detected by the second voltage detector 23 is corrected as the duty ratio of the PWM during one carrier and then an amount of charge of the capacitors is manipulated to suppress the voltage imbalance, leading to the same effects as the preceding method.

Embodiment 2 has a configuration in which the first voltage detector 23 detects a voltage of the first capacitor 6 and the second voltage detector 24 detects a voltage of the second capacitor 7. However, the structure is not limited thereto. For example, the DC voltage Vo applied to the DC load 8 and a voltage across the second capacitor 7 to be detected by the second detector 24 may be detected, and a voltage across the first capacitor 6 may be obtained by calculation instead of detection.

In addition, in Embodiment 2 which is described in terms of the unipolar modulation, two switch operation modes, one in FIGS. 5(c) and 5(d) and the other in FIGS. 5(f) and 5(g), leading to the voltage doubler rectification always occur during the same polarity in the AC power supply 1. A configuration in which the unipolar modulation is not used always requires different operation modes of voltage doubler rectification. In other words, both of the two capacitors 6, 7 connected in series must be connected to the input terminals of the rectifier 2, thereby allowing the capacitor voltage imbalance to be suppressed. Furthermore, it is important to control the actuation of the two bidirectional switches 10, 11 so as to balance an amount of charge between the capacitors 6, 7 during different polarities in the AC power supply.

Figure 11:
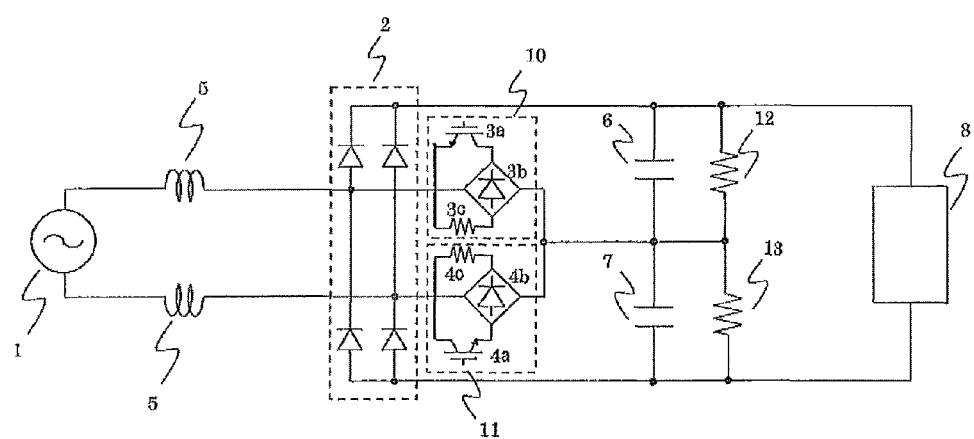
FIG. 11 is another block diagram according to Embodiment 2.

As shown in FIG. 11, a voltage dividing circuit composed of resistors 12, 13 connected in parallel to the first and second capacitors 6, 7 causes the divided voltage of the DC voltage Vo to be an intermediate voltage at a connecting point between the first capacitor 6 and the second capacitor 7, allowing the voltage difference between the capacitors to be suppressed based on resistance voltage dividing. In addition, instead of inserting the reactor 5 into one side of the AC power supply 1 as shown in FIGS. 1 and 9, reactors 5a, 5b are inserted to both sides of the AC power supply 1 as shown in FIG. 11, thereby reducing voltage imbalance. As described above, the voltage imbalance can also be suppressed by adding such a circuit element.

Embodiment 2 includes a configuration intended to suppress a harmonic current and a DC offset component by balancing the capacitor voltage. However, the structure is not limited thereto. Needless to say, an input current detector for detecting a harmonic current in an input current, for example, is provided and the modulation ratio and the amplitude is corrected so as to minimize the harmonic current, which poses no problems and provides the similar effects.

Furthermore, it goes without saying that instead of detecting an input current, detecting a neutral point current flowing through a connecting point between the first and second bidirectional switches 10, 11 and a connecting point between the first and second capacitors 6, 7 and suppressing the offset component also provide the similar effects.

The configuration described above suppresses the imbalance between the capacitors as well as a harmonic current, in particular, even harmonics resulting from the imbalance. Also, it can suppress the DC offset component as well as reduce the adverse effects on other apparatuses connected to the AC power system, thereby implementing a reliable AC-DC converter. Furthermore, there is no need for a capacitor having a higher withstand voltage more than necessary, which allows the use of a capacitor having a reasonable withstand voltage and suppresses progress of degradation of only one of the capacitors.

Embodiment 3

Figure 12:
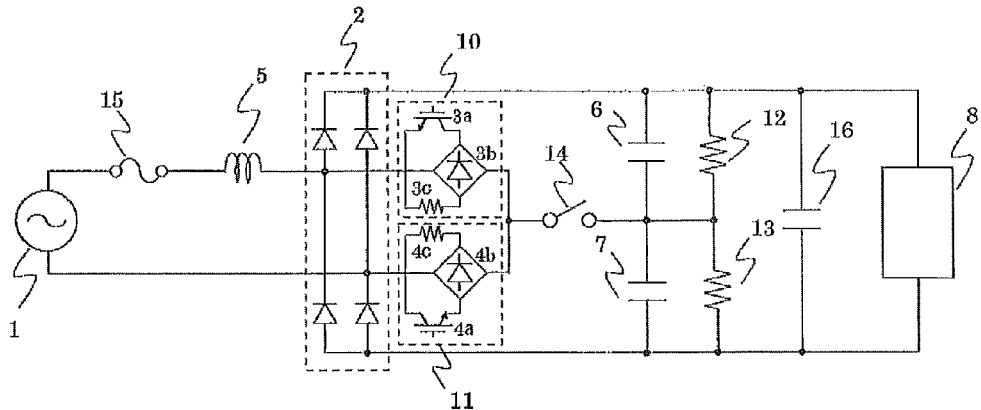
FIG. 12 is the circuit block diagram showing the AC-DC converter according to Embodiment 3 of the present invention.

FIG. 12 is a circuit block diagram showing an AC-DC converter according to Embodiment 3 of the present invention. The reference numerals and symbols in FIG. 12 refer to the same components as those with the same reference numerals and symbols in Embodiments 1 and 2 described in FIGS. 1 and 9, and repeated descriptions of the same components are omitted.

An AC-DC converter as shown in FIG. 12 includes a relay 14 (third bidirectional switch) provided between a connecting point between the first and second bidirectional switches 10, 11 and a connecting point between the first and second capacitors 6, 7 for protecting the circuit in the event of a short-circuit failure of the two bidirectional switches 10, 11, and a smoothing capacitor 16 connected in parallel with series resistors 12, 13. The smoothing capacitor 16 is intended for stabilizing a voltage across the first capacitor 6 and the second capacitor 7 that are connected in series. Also, the converter includes a fuse 15 inserted into a connecting line to the AC power supply 1.

The afore-mentioned smoothing capacitor 16 utilizes a neutral point voltage at a connecting point between the first capacitor 6 and the second capacitor 7 connected in series as described above as a converter voltage Vc to control the converter voltage Vc. However, series-connected capacitors cause its composite capacitance to decrease against the capacitance of a single unit. For example, if each of the first capacitor 6 and the second capacitor 7 has a capacitance of 1000 μF, the composite capacitance is 500 μF, a half of 1000 μF. Accordingly, the smoothing capacitor 16 is used to supplement such a reduced capacitance. In other words, assuming that a capacitance of 1000 μF is necessary for the DC load 8, each of the first capacitor 6 and the second capacitor 7 has a capacitance of 1000 μF and the smoothing capacitor 16 has a capacitance of 500 μF, which gives a composite capacitance of 1000 μF.

As described above, the capacitance necessary for the DC load 8 is supplemented with the smoothing capacitance 16, thereby allowing reduction in the number of components and ensuring necessary capacitance.

The cost for a capacitor is determined by its capacitance and withstand voltage. The smoothing capacitor 16 can secure higher capacitance for the DC load 8 with a small capacitance as compared with the first capacitor 6 and the second capacitor 7, but it requires two-fold withstand voltage for this purpose. Needless to say, if increased withstand voltage causes higher costs than increased capacitance, increasing the capacitance of the first capacitor 6 and the second capacitor 7, instead of adding the smoothing capacitor 16, also results in the accomplishment of this purpose, posing no problems as well as minimizing an increase in cost.

The relay 14 is described below. The first and second bidirectional switches 10, 11 are provided with current detectors 3c, 4c for protecting switching elements such as IGBTs 3a, 4a from a short-circuit failure, in which protection against a short-circuit failure is provided by an overcurrent detector 22. However, in order to further secure the safety of products, the relay 14 is provided against rare cases in which protection against overcurrent is not provided. The relay 14 is always in the on state, and is in the off state only when providing protection.

Patent Documents 1, 2 incorporated herein by reference describe that in the event of a short-circuit failure encountered by a switching element, which causes the AC power supply to be normally short-circuited, a fuse mounted in the input side of the AC power supply is blown to prevent damage to a product from progressing. Also, Patent Documents 3, 4 describe that if a switching element encounters a short-circuit failure, a fuse is blown when a switch as the other relay is in the on state, and is in the voltage doubler rectification mode when the switch as a relay is in the off state, thereby allowing normal operation.

Embodiment 3 uses two switching elements (IGBT 3a, 4a). If one switching element should encounter a short-circuit failure and the other is in the on state, a short-circuit current flows, like the afore-mentioned Patent Documents 3, 4. However, since there are provided the current detectors 3c, 4c for preventing the short-circuit failure, protection against overcurrent is provided to ensure operation before the fuse 15 is blown.

As described above, in a conventional technology, since a short-circuit failure always causes a fuse to blow, the apparatus becomes disabled, which makes a user aware of the presence of a failure. However, Embodiment 3 allows the AC-DC converter to continue its operation without the fuse 15 being blown as long as one of the switching elements normally operates even if the other switching element encounters a short-circuit failure. If operation is continued under these circumstances, a great amount of harmonic current flows out through the AC power supply system, causing a current having DC offset superposed thereon to flow, which poses a concern about adverse effects on, for example, electrical home appliances.

In Embodiment 3, a relay 14 is inserted between a connecting point between the first and second bidirectional switches 10, 11 and a connecting point between the first and second capacitors 6, 7, as describe above. In addition, if an abnormal signal frequently arises from the overcurrent detector 22, a switching element is judged to have encountered a short-circuit failure and a signal is generated which terminates the actuation of the first and second bidirectional switches 10, 11 and turns off the relay 14.

Since a short-circuit failure in one of the switching elements results in the same mode as the voltage doubler rectification, a voltage two times that for the full-wave rectification is outputted to the DC load 8. There is no problem if the DC load 8 is guaranteed to withstand such a voltage. However, assuming that a domestic supply voltage is 200 V, about 565 V is outputted in the voltage doubler mode and it rises up to 622 V when the AC power supply system has a voltage fluctuation of +10 percent. Since usual semiconductors have a withstand voltage of 600 V and a withstand voltage higher than that voltage causes an increase in cost, it is estimated that an application voltage exceeding 600 V is not acceptable to the load side. Consequently, an output voltage is limited to approximately rectified voltages resulting from the full-wave rectification by opening of the relay 14, thereby suppressing damage to the DC load 8 due to failure to withstand the voltage.

Protection against overvoltage is described below. If normal conditions are met, both of the first and second bidirectional switches 10, 11 are turned off. Then, assuming that an overvoltage protection level is at a first overvoltage level higher than a full-wave rectification reference voltage, if both of the two bidirectional switches 10, 11 being turned off does not result in lower voltages than such a first overvoltage level, the relay 14 is turned off, for example, when a second overvoltage level is exceeded which is set at a level higher than the first overvoltage level and lower than the voltage doubler rectification reference voltage.

Accordingly, actuation of the two bidirectional switches 10, 11 are terminated by the overvoltage protection against an increase of the DC voltage Vo resulting from a malfunction due to noise emissions and sudden stop of the DC load 8. If a voltage does not still decrease, the relay 14 is turned off and the converter is forcibly brought into the full-wave rectification mode since there is concern that any one of the switches fails.

In addition, a third overvoltage level higher than the second overvoltage level is set. If the relay 14 for protecting the first and second bidirectional switches 10, 11 from a short-circuit failure fuses and the third overvoltage level is exceeded, both of the two bidirectional switches 10, 11 may be turned on, thereby forcibly causing a power supply short-circuit and meltdown of the fuse 15.

Operation based on the third overvoltage level may be implemented using circuit hardware or software such as a control microcomputer. This ensures protection of components, which provides extra protection, improving reliability of a product employing an AC-DC converter according to Embodiment 3.

Embodiment 4

Figure 13:
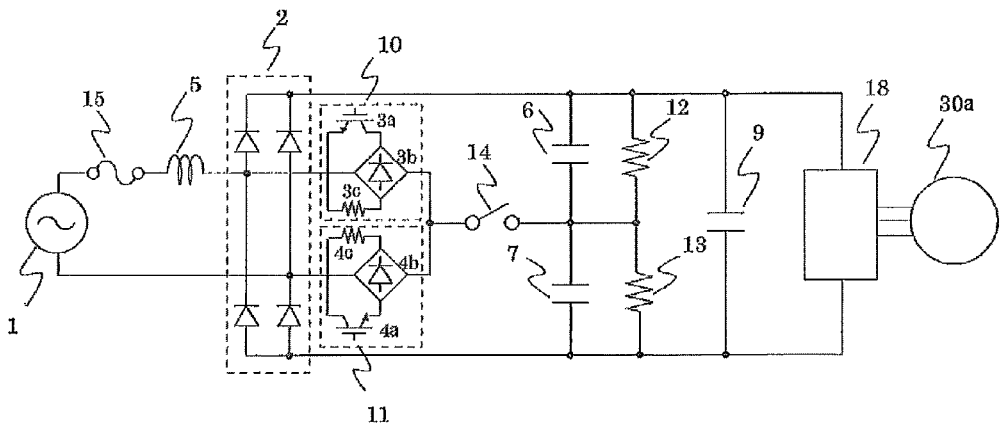
FIG. 13 is the circuit block diagram showing the AC-DC converter according to Embodiment 4 of the present invention.
Figure 14:
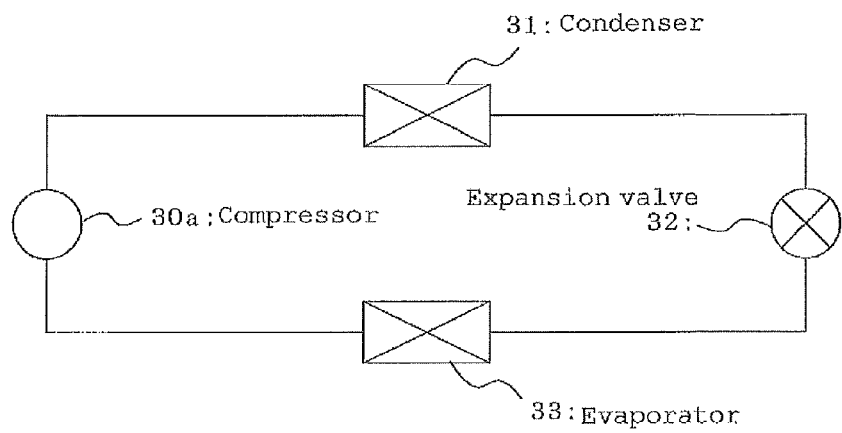
FIG. 14 is a refrigerant circuit diagram of an air conditioning apparatus.

FIG. 13 is a circuit block diagram showing a compressor driving apparatus according to Embodiment 4 of the present invention. FIG. 14 is a refrigerant circuit diagram of an air conditioning apparatus. The reference numerals and symbols in FIGS. 13 and 14 refer to the same components as those with the same reference numerals and symbols in afore-mentioned Embodiments, and repeated descriptions of the same components are omitted.

As shown in FIG. 13, a compressor driving apparatus according to Embodiment 4 is composed of an AC-DC converter, an inverter 18 connected to the output terminal of the AC-DC converter, and a motor 30a (permanent-magnet motor) connected to the output terminal of the inverter 18. As shown in FIG. 14, the motor 30a is a motor of a compressor 30 mounted on the refrigerant circuit of an air conditioning apparatus. The output DC voltage Vo can be arbitrarily changed using the AC-DC converter in the range from the vicinity of the full-wave rectification to the vicinity of the voltage doubler rectification. This enhances the flexibility in design of the motor for the compressor 30.

In the case of, for example, an air conditioning apparatus, the motor 30a designed to provide high efficiency over an extended period of low-speed operation results in an increase in electromotive force constant of the motor 30a, which causes an increase in motor application voltage required for the maximum motor speed associated with rapid cooling or heating. This is the reason why motors must be designed so as to meet voltage boost limits.

When applied to an air conditioning apparatus, the compressor driving apparatus according to Embodiment 4 allows the DC voltage Vo, the output for rapid cooling or heating, to be boosted, thereby arbitrarily varying the DC voltage Vo required for the maximum motor speed. This ensures that the motor 30a is designed so as to provide high efficiency in low-speed operation and, at the time of the maximum speed, the DC voltage Vo is boosted to give the maximum speed using a AC-DC converter.

This arrangement enables the improvement of efficiency associated with low-speed operation, in other words, users' normal service conditions without degrading the performance of an air conditioning apparatus during rapid cooling, rapid heating, or overload operation.

The output DC voltage Vo can be controlled according to the speed, load torque, or shaft output of the motor 30a and inverter output, which makes the optimum DC voltage Vo for the motor 30a, thereby suppressing an iron loss in the motor 30*a* resulting from operation of the inverter 18 and enhancing the efficiency of the motor 30*a* and the inverter 18.

When the motor 30*a* is driven, a high DC voltage Vo is necessary for high-speed operation, while a low DC voltage Vo suffices to drive the motor 30*a* at low speeds.

Figure 2:
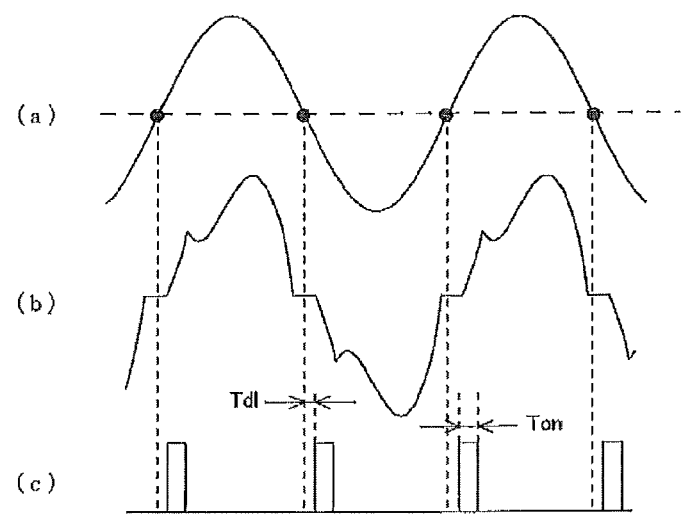
FIG. 2 is a conventional waveform chart for describing Embodiment 1.

Accordingly, the DC voltage Vo may be ensured by actuating the first and second bidirectional switches 10, 11 using the switching as shown as a conventional technology in FIG. 2, instead of actuating them using the switching as shown in FIG. 4.

When the motor 30*a* is driven, switching of the actuation of the first and second bidirectional switches 10, 11 to either one of the switching systems in FIGS. 2 and 4 according to the speed of the motor 30*a* poses no problems. In addition, needless to say, a system configuration which enhances the efficiency of the entire system including the motor 30*a*, the inverter 18, and the AC-DC converter provides similar or better effects. In addition, although only one pulse actuation per half cycle of the power supply is used in FIG. 2, several actuations pose no problem. The number of pulses less than the level causing an increase in noise poses no problems is preferable.

Embodiment 5

Figure 15:
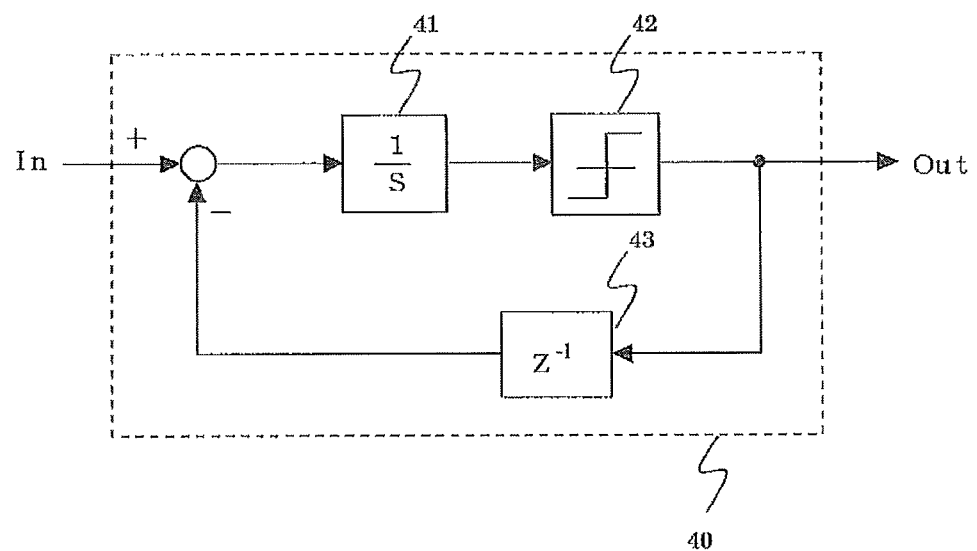
FIG. 15 is a control block diagram showing an actuation signal generating section for a control circuit in the AC-DC converter according to Embodiment 5.
Figure 16:
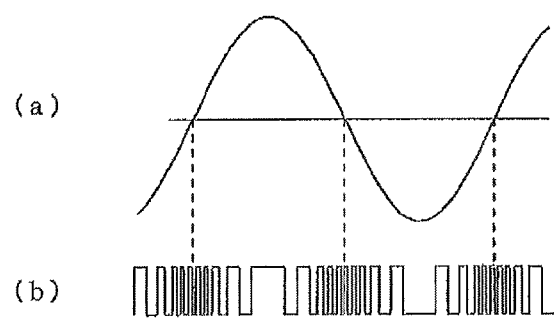
FIG. 16 is an operation waveform chart of pulse density modulation in the AC-DC converter according to Embodiment 5.
Figure 17:
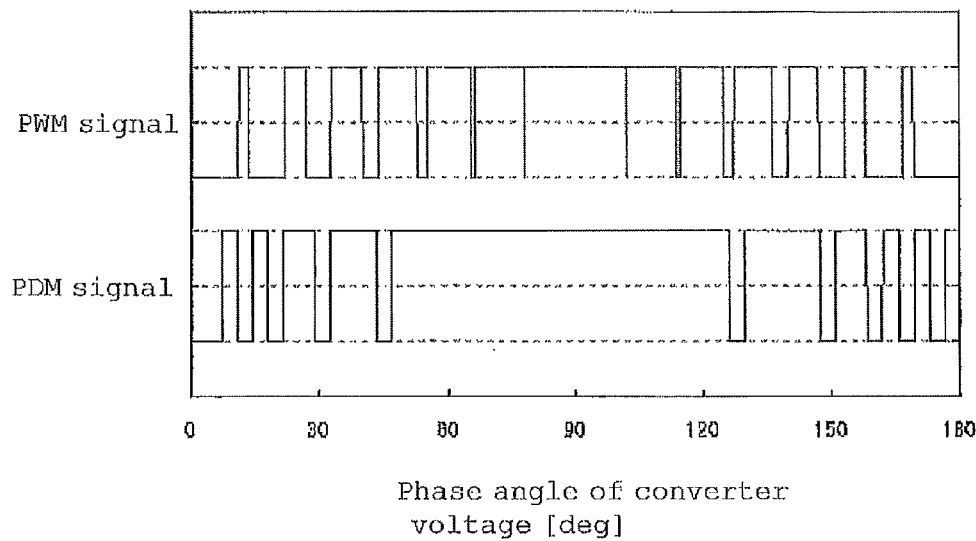
FIG. 17 is a waveform chart showing pulse width modulation and pulse density modulation in the AC-DC converter according to Embodiment 5.

FIG. 15 is a control block diagram showing an actuation signal generating section for a control circuit in an AC-DC converter according to Embodiment 5. FIG. 16 is an operation waveform chart of pulse density modulation in the AC-DC converter according to Embodiment 5. FIG. 17 is a waveform chart showing pulse width modulation and pulse density modulation in the AC-DC converter according to Embodiment 5.

Embodiment 5 includes an actuation signal generating section 27 for a control circuit 20 in an AC-DC converter having a load of an inverter 18 for driving a motor 30*a*, which has a ΔΣ converter 40 for use in an ordinary analog-digital converter applied thereto. The ΔΣ converter 40 includes an integrator 41, quantizer 42, and a delay circuit 43, which pulse-density modulates (PDM) input signals. Afore-mentioned embodiments are described in terms of unipolar modulation. The unipolar modulation compares a triangle wave as a carrier wave with a modulation signal or the converter voltage Vc in this case to generate an actuation signal for the first and second bidirectional switches 10, 11. Accordingly, it can be said that the unipolar modulation also generates actuating waveforms using the pulse width modulation (PWM).

Distribution of actuation signals to the first bidirectional switch 10 and the second bidirectional switch 11 is described in terms of unipolar modulation, as described above, and it is described below in terms of pulse width modulation.

PDM is the modulation to inter-pulse density. Pulse-density modulation of the sine wave in FIG. 16(*a*) gives a signal shown in FIG. 16(*b*). The purpose of an AC-DC converter according to Embodiment 5 is to use low-frequency switching wherever possible in order to keep costs at the level of the noise suppression components described in Patent Document 1 or 2 incorporated herein by reference.

The converter voltage Vc of a unipolar-modulated wave is pulse-density modulated to give an actuation signal having less switching and noise emissions than the PWM modulation. This allows low-frequency switching at a further lower frequency such as 1 to 5 kHz, reducing noise suppression costs and suppressing an increase in cost.

Since the pulse density modulation can also be utilized as DA conversion, unlike the above, the converter voltage Vc is pulse-width modulated (PWM) to generate an actuation signal, and its PWM signal is pulse-density modulated (PDM). As shown in FIG. 17, this configuration reduces the number of pulses in comparison with the PWM signal, thereby suppressing switching, particularly, in the vicinity of a peak, which results in more reduction in self noise than the PWM control and implementation using low-cost noise suppression.

Embodiment 5 is described in terms of pulse density modulation. However, modulation is not limited to the pulse density modulation (PDM). For example, phase angle is divided into predetermined sections, in which temporal ratio may be distributed. In addition, since the duty ratio of the PWM signal is uniquely set according to a phase angle when a load or the output of the motor 30*a* in this case is constant, the number of pulses may be reduced using repetitive control. This reduces switching like the PDM and suppresses noise emissions, leading to implementation using low-cost noise suppression.

Figure 18:
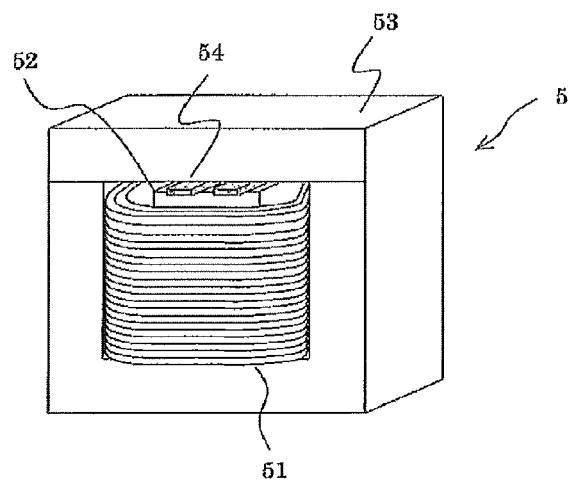
FIG. 18 is a configuration diagram of a reactor used in the AC-DC converter.

An AC-DC converter according to each of Embodiments provides switching at low frequencies, and also provides low-frequency switching whether under PWM or PDM control at low-carrier frequencies, like 1 to 5 kHz, causing the reactor 5 to produce audible electromagnetic noise emissions in a low tone which is offensive to the ear. As shown in FIG. 18, for example, in the case of a reactor 5 having a winding 51 provided in the center thereof, a core 52 in the center is an electromagnet that attracts and vibrates a laterally-facing core 53, causing electromagnetic noise emissions. The core 52 in the center and the core 53 at the top of the reactor have a clearance or so called gap. Therefore as shown in FIG. 18, inserting a non-magnetic resin component 54, for example, into the gap prevents the upper core 53 from deflecting or vibrating, thereby suppressing electromagnetic noise emissions from the reactor 5. Needless to say, the winding 51 made of aluminum, copper, or other material provides similar effects.

Although insertion of a non-magnetic resin component 54 into the gap is described above, such an insertion component is not limited thereto. Any component may be used if it has a configuration that can prevent the reactor 5 from producing electromagnetic noise emissions. In addition, the PWM control causes a peak sound primarily composed of a carrier frequency component to be produced, while the PDM control causes a peak specific frequency resulting from the carrier frequency to be dispersed, suppressing a peak sound that is offensive to the ear. Furthermore, the carrier frequency component may be dispersed by randomly distributing vectors using space vector control under the PWM control.

Figure 19:
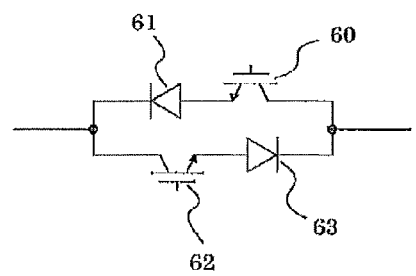
FIG. 19 is the circuit diagram showing another example of a bidirectional switch.

In addition, although the first and second bidirectional switches is composed of IGBTs 3*a*, 4*a* and diode rectifiers 3*b*, 4*b*, as described above, they may be composed of a first switching element 60 and a first diode 61 connected in series for passing a current in one direction and a serially connected second switching element 62 and second diode 63 connected in parallel with the first switching element 60 and the first diode 61 for passing a current in a reverse direction, as shown in FIG. 19. FIG. 19 shows that a connecting point between the first switching element 60 and the first diode 61 and a connecting point between the second switching element 62 and the second diode 63 are not connected. However, a bidirectional switch having these connecting points connected is also viable.

INDUSTRIAL APPLICABILITY

An AC-DC converter according to the present invention can be applied to, for example, a power supply system intended for a DC electrical power-consuming electrical load. In particular, it can be utilized as a power supply system for an inverter. An energy-saving, low-cost, and low-noise AC-DC converter that can be accomplished by using the inverter 18 for driving the motor 30*a* can be applied to a general electrical home appliances such as an air conditioning apparatus, a freezing apparatus, and a washing and drying apparatus as well as a refrigerator, a dehumidifier, a heat pump water heater, a showcase, and a vacuum cleaner. It can be applied to a fan motor, ventilation fan, hand drier and the like. Also, it can be applied, unlike the motor 30*a*, to an apparatus having no moving components, for example, a product utilizing electromagnetic induction, such as electromagnetic induction cooker.

The invention claimed is:

1. An AC-DC converter comprising:
   a rectifier connected to an AC power supply via a reactor;
   a plurality of capacitors connected in series across output terminals of the rectifier;
   a first bidirectional switch having one end connected to one input terminal of the rectifier and another end connected to a connecting point between a plurality of capacitors;
   a second bidirectional switch having one end connected to the other input terminal of the rectifier and another end connected to the other end of the first bidirectional switch;
   a normally closed third bidirectional switch inserted between the connecting point of the other end between the first and second bidirectional switches and a connecting point between the plurality of capacitors; and
   control means for actuating the first and second bidirectional switches during a half cycle of the AC power supply so as to control a voltage input to the rectifier to obtain a desired value of an output voltage.

2. The AC-DC converter of claim 1, wherein the control means actuates the first and second bidirectional switches using an actuation signal such that a voltage across the input terminals of the rectifier has a sinusoidal waveform.

3. The AC-DC converter of claim 1, wherein the control means actuates the first and second bidirectional switches so as to control at least one of an amplitude and a phase difference of a voltage across the input terminals of the rectifier.

4. The AC-DC converter of claim 1, wherein the control means actuates the first and second bidirectional switches using actuation signals subjected to PWM, respectively.

5. The AC-DC converter of claim 4, wherein each actuation signal that has been subjected to PWM and generated by the control means is alternately switched for each predetermined phase angle of the AC power supply for actuating the first and second bidirectional switches.

6. The AC-DC converter of claim 4, wherein the control means further performs pulse-density modulation (PDM) on the actuation signal subjected to PWM for actuating the first and second bidirectional switches.

7. An AC-DC converter, comprising
   a rectifier connected to an AC power supply via reactor;
   a plurality of capacitors connected in series across output terminals of the rectifier;
   a first bidirectional switch having one end connected to one input terminal of the rectifier and another end connected to a connecting point between a plurality of capacitors;
   a second bidirectional switch having one end connected to the other input terminal of the rectifier and another end connected to the other end of the first bidirectional switch; and
   control means for actuating the first and second bidirectional switches during a half cycle of the AC power supply so as to control a voltage input to the rectifier to obtain a desired value of an output voltage,
   wherein the control means reallocates the actuation signal subjected to PWM according to an occurrence ratio for each predetermined phase angle for reducing the number of actuations of the first and second bidirectional switches.

8. The AC-DC converter of claim 4, wherein a carrier frequency of the PWM is 5 kHz or less.

9. The AC-DC converter of claim 1, wherein the control means generates an actuation signal for the first and second bidirectional switches using PDM.

10. The AC-DC converter of claim 1, the control means comprising:
    a full-wave rectification mode in which both the first and second bidirectional switches are turned off;
    a first voltage doubler rectification mode in which the first bidirectional switch is turned on and the second bidirectional switch is turned off;
    a second voltage doubler rectification mode in which the first bidirectional switch is turned off and the second bidirectional switch is turned on; and
    a power supply short-circuiting mode in which both the first and second bidirectional switches are turned on,
    wherein all of the four modes occur during a half cycle of an AC power supply.

11. The AC-DC converter of claim 10, wherein the control means controls the first voltage doubler rectification mode and the second voltage doubler rectification mode so that an occurrence ratio becomes uniform during the same polarity of the AC power supply.

12. The AC-DC converter of claim 10, wherein the control means controls the first voltage doubler rectification mode and the second voltage doubler rectification mode so that the occurrence ratio becomes uniform during the different polarities of the AC power supply from each other.

13. The AC-DC converter of claim 10, wherein the control means controls the first voltage doubler rectification mode and the second voltage doubler rectification mode so that they alternate.

14. The AC-DC converter of claim 10, further comprising a voltage detector for detecting each voltage across the plurality of capacitors, wherein the control means controls an occurrence ratio of the first voltage doubler rectification mode and the second voltage doubler rectification mode so that a difference between voltages across the plurality of capacitors detected by the voltage detector becomes small.

15. An AC-DC converter comprising:
    a rectifier connected to an AC power supply via a reactor;
    a plurality of capacitors connected in series across output terminals of the rectifier;
    a voltage detector for detecting a voltage across the capacitor connected to a negative terminal side of the rectifier;
    a first bidirectional switch having one end connected to one input terminal of the rectifier and another end connected to a connecting point between a plurality of capacitors;
    a second bidirectional switch having one end connected to the other input terminal of the rectifier and another end connected to the other end of the first bidirectional switch; and
    control means for actuating the first and second bidirectional switches during a half cycle of the AC power supply so as to control a voltage input to the rectifier to obtain a desired value of an output voltage,
    wherein the control means causes each of the following four modes to occur during a half cycle of an AC power supply:

a full-wave rectification mode in which both the first and second bidirectional switches are turned off, a first voltage doubler rectification mode in which the first bidirectional switch is turned on and the second bidirectional switch is turned off, a second voltage doubler rectification mode in which the first bidirectional switch is turned off and the second bidirectional switch is turned on, and a power supply short-circuiting mode in which both the first and second bidirectional switches are turned on, and calculates a voltage across the other capacitor from the voltage across the capacitor detected by the voltage detector and the output voltage and controls an occurrence ratio of the first voltage doubler rectification mode and the second voltage doubler rectification mode so that these voltage differences across capacitors become small.

16. The AC-DC converter of claim 1, wherein the control means actuates the first and second bidirectional switches so as to obtain a desired value of the output voltage according to an output power or an input current.

17. The AC-DC converter of claim 1, wherein the control means actuates the first and second bidirectional switches during a half cycle of an AC power supply so as to obtain a desired value of the output voltage and turns off the third bidirectional switch when the output voltage exceeds a predetermined value.

18. The AC-DC converter of claim 1, wherein the control means forcibly turns off the first and second bidirectional switches when the output voltage exceeds a predetermined first voltage level and turns off the third bidirectional switch when the output voltage exceeds a second voltage level set at a level higher than the first voltage level.

19. The AC-DC converter of claim 1, further comprising a fuse inserted between the input terminals of the rectifier, wherein the control means forcibly turns off the first and second bidirectional switches when the output voltage exceeds the predetermined first voltage level, turns off the third bidirectional switch when the output voltage exceeds the second voltage level set at a level higher than the first voltage level, and forcibly turns on the first and second bidirectional switches when the output voltage exceeds the third voltage level set at a level higher than the second voltage level to blow the fuse.

20. The AC-DC converter of claim 1, further comprising a smoothing capacitor connected in parallel with the plurality of capacitors.

21. The AC-DC converter of claim 1, further comprising a voltage dividing circuit connected in parallel with the plurality of capacitors.

22. The AC-DC converter of claim 1, wherein the reactor is implemented as a plurality of reactors that are connected to each input terminal of the rectifier, respectively.

23. The AC-DC converter of claim 1, wherein the reactor has a resin component inserted into a magnetic flux gap for suppression of an electromagnetic noise.

24. The AC-DC converter of claim 1, wherein the first and second bidirectional switches are composed of at least a diode rectifier and a switching element.

25. The AC-DC converter of claim 1, the first and second bidirectional switches include a first switching element and a first diode connected in series for passing a current in one direction and a second switching element and a second diode connected in series for passing the current in the reverse direction.

26. A compressor driving apparatus, comprising:
the AC-DC converter of claim 1,
an inverter having a compressor motor connected to output terminal thereof, which converts a DC electrical power from the AC-DC converter into an AC electrical power.

27. The compressor driving apparatus of claim 26, wherein the control means of the AC-DC converter is provided with a control mode for actuating at least one of a first bidirectional switch or a second bidirectional switch once to several times during a half cycle of a power supply and switches to the control mode according to the speed of the motor or a motor input.

28. An air conditioning apparatus having a refrigerant circulated by the compressor driving apparatus of claim 26.

* * * * *